UNITED STATES PATENT OFFICE.

CARL ADOLF BRACKELSBERG, OF STOCKUM, DUSSELDORF, GERMANY.

PROCESS OF MANUFACTURING PURE IRON OR MANGANESE METAL FROM PURE OR IMPURE IRON OR MANGANESE-METAL OXIDS.

1,103,258.  Specification of Letters Patent.  Patented July 14, 1914.

No Drawing.  Application filed December 11, 1911.  Serial No. 665,139.

*To all whom it may concern:*

Be it known that I, CARL ADOLF BRACKELSBERG, a citizen of the Empire of Germany, residing at Stockum, Dusseldorf, in the Empire of Germany, have invented a new and useful Process of Manufacturing Pure Iron or Manganese Metal from Pure or Impure Iron or Manganese-Metal Oxids, of which the following is a specification.

My invention relates to a new method of producing pure metallic iron or manganese from pure or impure oxids of iron and manganese by treatment of the dry oxids with hydrochloric acid gas, and thus removing, and purifying the metallic substances from arsenic, sulfur, antimony, copper, lead, zinc, etc., and at the same time agglomerating the fine metal powders to produce a metal sponge as final product.

As is well known, it is possible by adding chlorids to ores, by roasting, that is oxidizing the ores, and by subsequently lixiviating the ores to remove from the ores copper almost completely, zinc and lead less completely, but arsenic and antimony nearly not at all. Also it is known that by roasting the ores with chlorids the chlorids of metal can be partly volatilized. In the periodical "*Stahl und Eisen*," 1909, page 551, it has been proposed for the process of forming briquets from ores and of subsequently oxidizing them by burning to remove from the iron and manganese ores the impurities by adding chlorids. However, it is not possible to remove considerable quantities of zinc, lead, copper. etc., by the addition of chlorids, even if a multiple of the required quantity is added. The addition of chlorids and also every addition not volatilizable produces a reduction of the percentage of metals in the residues, briquets, agglomerates, etc., and thereby diminishes their value.

The manufacture of metallic sponge was hitherto effected by reducing the ore powders while melting them together. According to my new method a lye of chlorid of magnesium or calcium is employed for forming agglomerates, which are highly porous and can therefore be easily impregnated with reducing agents, carbon oxids, carbohydrogen gas, mineral oil, tar, and the like and reduced to metallic sponge.

Whereas in the old methods the metals are obtained or removed by means of the chloridizing oxidation, in my new method, on the contrary, this is effected by means of the chloridizing reduction, that is to say oxid combinations are turned into protoxid combinations. In this manner zinc, copper, lead, arsenic, antimony, sulfur, etc., can be not only completely removed from the iron and manganese ores and the products therefrom, but also be obtained in one single operation, while at the same time any fine metallic powder is agglomerated and the percentage of metal in the residues is not diminished but is increased to a maximum by the reduction to metallic sponge.

The new method is based upon the fact, that at from 1100 degrees to 2200 degrees F. the sulfids of arsenic, antimony, copper, lead, zinc, iron, etc., in the presence of sufficient quantities of iron or manganese ores are completely decomposed by means of hydrochloric acid, so that chlorids of metals, protoxids of iron and of manganese, steam and sulfurous acid are formed. At the same time the chlorid of iron and of the chlorid of manganese formed react upon the oxids of zinc, lead, copper, arsenic, etc., so that protoxids of iron and or manganese and chlorids of the said metals are formed, which volatilize and can be obtained by condensation.

The following equations illustrate the reaction:

(1.)  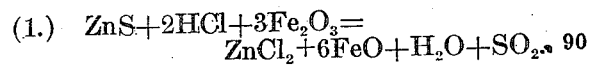

(2.)  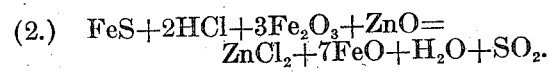

(3.)  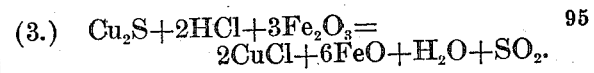

(3ª.) 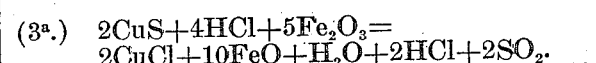

(4.)  

When the hydrochloric acid is permitted to act for a sufficiently long time the resulting reactions will be quantitative. For example the roasting of a gravel containing .414% As, .25% Pb, .04% Cu, 2.21% Zn, 1.31% S for about an hour furnished a product containing .032% As, 00% Pb, .00% Cu, .08% Zn, .08% S. Instead of the hydrochloric acid also a mixture of chlorin gas with steam or a mixture of chlorin gas with hydrogen gas or carbohydrogen gas may be employed, so that during the process the hydrochloric acid will be therefrom formed. From the steam and the chlorin in the presence of sulfids of metals and oxids of iron and or manganese hydrochloric acid, sulfurous acid and oxids of metals will be formed, which oxids at once react upon the hydrochloric acid for forming chlorids of metals and steam.

For carrying the new method into effect the material is first reduced to the size of nuts or peas and any resulting powder is agglomerated by moistening it with a lye of chlorid of magnesium or a lye of chlorid of calcium, agitating the mass and drying it by means of rotary tubes. Instead of these lyes also other binding means may be employed, it being immaterial whether the binding means be decomposed by glowing or not. The material so prepared and containing sufficient quantities of oxids of iron or manganese is brought to red heat up to white heat in muffles or retorts and is there exposed to the action of hydrochloric acid, whereby the reactions are made to take place, the metal chlorids being separated by volatilization from the lower oxids of iron and manganese, and the sulfur escaping as sulfur dioxid. The chlorids removed by volatilization are cooled and are treated with steam the chlorids of arsenic and antimony can be converted into the corresponding oxids, as indicated by the following equation,—

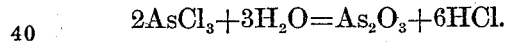
$$2AsCl_3 + 3H_2O = As_2O_3 + 6HCl.$$

The remaining residue, the particles of which are concreted my means of protoxids of iron and or of manganese, is practically free from arsenic, antimony, copper, lead, zinc, sulfur, etc. In order to turn this residue into metallic sponge after finishing the supply of hydrochloric acid generator gas or other reducing gases or mineral oil tar, etc., are permitted to act upon the residue under red heat up to white heat. Thereby a keen reduction is effected, more particularly if only agglomerates are employed, since these are most porous and can be easily impregnated with the reducing agents.

In case the material intended to be treated is very compact or contains protoxids of iron or manganese or considerable quantities of sulfur, it is preferably agglomerated, brought to red heat and exposed to the action of first air or steam and then hydrochloric acid gas. The process of the present invention gives as products resulting therefrom the following: 1. The metals arsenic, antimony, copper, lead and zinc. etc., are obtained as the chlorids or as oxids. 2. The iron and manganese residues are free from these impurities and in a porous metallic form or metal sponge.

Obviously any known and approved furnace, apparatus and other devices may be employed for carrying the new method into effect, the essential point being, that the various desired products and effects be obtained.

I claim:

The herein described method of purifying and agglomerating ores of iron in one single operation, which consists in powdering the material, agglomerating the powder by moistening it with a binding means, agitating and drying the mass, heating the material to red heat and exposing it first to the action of air or steam and then under red heat up to white heat to the action of hydrochloric acid, so as to decompose the sulfids of arsenic, antimony, copper, lead, zinc, iron, etc. and to form chlorids of metals protoxids of iron, steam and sulfurous acid, all of which evaporate, and leading off the vapors, so that the residue concreted by means of protoxid of iron resulting from the reaction is practically free from arsenic, antimony, copper, lead, zinc, sulfur, etc.

CARL ADOLF BRACKELSBERG. [L. S.]

Witnesses:
 HELEN NUFER,
 ALBERT NUFER.